US006528447B1

(12) United States Patent
Ghosh et al.

(10) Patent No.: US 6,528,447 B1
(45) Date of Patent: Mar. 4, 2003

(54) PROCESS FOR THE PREPARATION OF A CATALYST COMPOSITE

(75) Inventors: Sobhan Ghosh, Faridabad (IN); Satish Makhija, New Delhi (IN); Venkatachalam Krishnan, Faridabad (IN); Sanjay Kumar Ray, Faridabad (IN); Mohan Prabhu Kuvettu, Faridabad (IN)

(73) Assignee: Indian Oil Corporation Limited, Mumbai (IN)

( * ) Notice: Subject to any disclaimer, the term of this patent is extended or adjusted under 35 U.S.C. 154(b) by 0 days.

(21) Appl. No.: 09/272,305

(22) Filed: Mar. 19, 1999

(51) Int. Cl.$^7$ .................................. B01J 29/08
(52) U.S. Cl. ............................ 502/65; 502/64; 502/68; 502/73; 502/79
(58) Field of Search .................... 502/64, 65, 68, 502/73, 79

(56) References Cited

U.S. PATENT DOCUMENTS

| | | | | |
|---|---|---|---|---|
| 4,086,187 A | * | 4/1978 | Lim et al. | |
| 4,142,995 A | * | 3/1979 | Alafandi et al. | |
| 4,164,465 A | * | 8/1979 | Gladrow | |
| 4,198,319 A | * | 4/1980 | Alafandi et al. | |
| 4,242,237 A | * | 12/1980 | Gladrow et al. | |
| 4,443,553 A | * | 4/1984 | Chiang et al. | |
| 4,584,091 A | * | 4/1986 | Pine | |
| 4,588,496 A | * | 5/1986 | Scherzer | |
| 4,810,369 A | * | 3/1989 | Scherzer | |
| 5,037,531 A | * | 8/1991 | Bundens et al. | |
| 5,173,463 A | * | 12/1992 | Macedo | |
| 5,997,729 A | * | 12/1999 | Itoh | |
| 6,114,267 A | * | 9/2000 | Ghosh et al. | |

* cited by examiner

*Primary Examiner*—Stanley S. Silverman
*Assistant Examiner*—Christina Ildebrando
(74) *Attorney, Agent, or Firm*—Venable; George H. Spencer; Ashley J. Wells

(57) ABSTRACT

A process for preparing a hydrocarbon conversion catalyst for use in a Fluid Catalyst Cracking (FCC) unit includes the steps of preparing a modified alumina-silica composite by reacting alumina with an acid to obtain an acidified alumina, aging the acidified alumina for from 0.25 to 60 hours, adding a silica source to the acidified alumina to obtain the composite; preparing a dispersed precursor slurry of the modified alumina-silica composite, and a rare earth exchanged USY zeolite (REUSY) containing at least one rare earth oxide present in an amount ranging from 3.8 to 4.0 wt %, and optionally kaolin clay; spray-drying the slurry to obtain spherical particles; and subjecting the spherical particles to calcination.

21 Claims, No Drawings

PROCESS FOR THE PREPARATION OF A CATALYST COMPOSITE

BACKGROUND OF THE INVENTION

1. Field of the Invention

The present invention relates to a process for the preparation of a catalyst composite. Specifically, it relates to a process for the preparation of a catalyst composite material suitable for hydrocarbon conversion, and particularly, the fluid catalytic cracking of high vacuum gas oil feedstocks. The catalyst prepared by the process of this invention is highly active, and selectively reduces bottom and coke while increasing yields of gasoline and total cycle oil (TCO). Besides, the catalyst possesses improved attrition resistance.

2. Description of the Related Art

FCC is a major secondary refining process practiced worldwide in the petroleum refineries. FCC catalyst is the heart of this process providing considerable flexibility to refiners to meet the required product slates. To improve the efficiency of this process, it is desired to upgrade the bottom products (boiling above 370° C.) to more valuable lighter products and less coke (due to regenerator hardware limitations). In this endeavor, not much emphasis is given in the prior art processes of FCC catalyst development.

Preparation of FCC catalyst is generally accomplished by admiring Y type zeolite, normal kaolin clay, and suitable binders. The produced aqueous slurry is generally subjected to agitation for uniform dispersion of individual components and then is spray dried to form dry catalyst microspheres.

A typical prior art catalyst preparation procedure involves the use of sodium silicate as silica source, aluminum sulfate, Y type zeolite, normal kaolin clay, and suitable acid to convert sodium silicate to silica sol binder. However, in this process, there are steps which involve repeated washing of sodium sulfate byproduct and subsequent exchange of sodium of the zeolite. This process is time consuming, hardware intensive, and requires a lot of demineralised water (DM). Also, there is a need for effluent treatment.

U.S. Pat. No. 4,142,995 mentions the use of silica-alumina gel in catalyst formulation for improving catalyst activity and attrition resistance. However, this art process has not addressed the issue of selectivity improvements like reduction of bottom and coke, and enhancement of TCO and gasoline yields. Person engaged in this art knows that preparation of silica-alumina gel is time consuming and requires several washings.

From an efficiency and economy point of view, it is generally preferred to use soda-free ingredients, i.e., binder, zeolite matrix, etc., to avoid series of washing steps. U.S. Pat. No. 4,443,553 teaches preparation of FCC catalyst using soda-free raw materials, wherein aluminium hydroxy chloride is used as viscosity reducing agent. This process suffers from the drawback, that is, chlorine evolved during the preparation procedure is corrosive and poses problems for the hardware and environment as well. Performance of the catalyst is not part of claims of the said patent. In addition to the above, presence of chlorine is likely to interfere with the efficiency of catalytic cracking.

While the prior art describes that different methods of formulating cracking catalysts often require high investments, catalysts are not able to meet the desired product requirements. Hence, the petroleum industry is continuously looking for a catalyst which will provide not only an acceptable range of physical properties and activity but also the most desirable selectivity with enhanced gasoline and TCO yields while reducing undesirable bottom and coke products. Development of bottom and coke selective catalyst becomes more relevant for low severity FCC unit operations prevalent in many countries like India.

Prior art processes demonstrate the performance of the steamed catalysts by means of ASTM Micro Activity Test (MAT), where the feed injection time is very long which leads to highly non-isothermal reaction conditions. The feed used is different from that used in commercial FCC units, and only one catalyst to oil ratio is employed. The product selectivity depends on these parameters and ASTM MAT is not suitable for predicting performance of the catalyst in a commercial FCC unit. To overcome this difficulty and to correctly predict catalyst performance in a commercial FCCU (FCC unit), in the present work, a commercial high vacuum gas oil feedstock is used to evaluate the catalyst at different catalyst to oil ratios at contact time much shorter than the conventional ASTM MAT conditions.

An object of the present invention is to provide a process for the preparation of FCC catalyst composite material useful for the conversion of petroleum hydrocarbons.

A further object of this invention is to provide a method for preparation of rare earth exchanged USY zeolite suitable for incorporation in FCC catalyst formulation.

It is another object of this invention to provide a FCC catalyst comprising modified alumina with silica.

It is yet another object of this invention to provide a process for the preparation of a FCC catalyst, which is simple and does not require any washing and exchange steps.

Yet another object of this invention is to provide a process for preparing a FCC catalyst having higher activity and properties to reduce coke and bottom yields.

Still another object of this invention is to provide a process for preparing a modified alumina component suitable for dual functionality of binding as well as enhancing catalytic activity.

It is still a further object of this invention to provide a process of catalyst preparation for increasing conversion, gasoline, yields and reduction of bottoms.

SUMMARY OF THE INVENTION

According to this invention, a process is provided for the preparation of catalyst, which consists of preparing a precursor slurry from highly dispersed components such as modified alumina-ammonium polysilicate, kaolin clay, rare-earth (Re) exchanged USY zeolite, thorough mixing and spray drying the slurry to obtain microspheroidal particles and then subjecting the particles to a step of calcination.

DESCRIPTION OF THE PREFERRED EMBODIMENTS

The Zeolite Component

The zeolite used may be any derivatives of faujasite, like $NaNH_4Y$, $ReNH_4Y$. Normal Y type zeolite contained in FCC catalyst undergoes dealumination in the commercial FCC unit, and as a result of this, catalytic activity falls while non-framework alumina contributes to the non-selective catalytic cracking leading to higher coke and dry gas. Hence, the use of USY zeolite with lower unit cell size and high crystallinity is preferred in FCC catalyst formulations.

Preferably, USY zeolite is employed having high hydrothermal stability, with $S_iO_2/Al_2O_3$ ratio of 6.5–8.0. The sodium content present in USY zeolite is preferred to be less than 1% wt. Further, to avoid post preparation rare-earth exchanged step, it is preferred to use rare-earth exchanged USY zeolite. Rare earth source may be single rare-earth chloride or mixture or rare-earth chlorides (of La, Ce, Nd, Pr).

To obtain the rare earth form of USY zeolite, low soda USY zeolite is dispersed in rare-earth chloride solution at elevated temperature of 60–80° C. for a period of 20–40 minutes. On completion of exchange, the final product is washed free of chlorides, which on volatile free basis contained 3.8–4% wt. of $Re_2O_3$ and about 0.9% wt of Na.

The Pseudoboehmite Component

Preferably, binder grade/pseudoboehmite is used having high crystallinity and crystallite size in the range of 45–60 Å and having low sodium content, preferably less than 0.1% wt. The alumina is preferred to have good surface area of 200–300 m$^2$/g. The pseudoboehmite alumina with the above properties is required to be gelled by a suitable acid, mineral or organic. Organic acids are preferred in place of mineral acids as chloride, sulfate, and nitrate radicals present in the latter are hazardous to hardware as well as to environment. Gelling character of alumina depends on nature of acid, quantity, and temperature. We have found that in order to obtain an alumina suitable to bind zeolite and clay and make the slurry pumpable, balanced quantity of acid must be used and gelled under controlled conditions. Alumina used in the present investigation has surface area of 260 m$^2$/g, crystallite size of 55 Å, pore radius of 28 Å.

The Polysilicate Component

Polysilicate, either Na stabilized or NH stabilized with low soda content is referred for use in the catalyst of our invention. NH stabilized polysilicate is more preferred than the Na stabilized polysilicate, for the reason of lower sodium level. This ingredient, due to its free flow nature and availability in low soda form, is ideal for creating low acidic matrix in the catalyst in the presence of alumina. Polysilicate with small particle size of 180–250 Å is preferred for incorporation into the catalyst of our invention. Ammonium polysilicate with 16% $SiO_2$ content and average particle size of 220 Å is used in the present investigation.

The Clay Component

Clays are used in FCC catalysts as filler, for improving the density and dissipation of heat. The most commonly used clays are laolinite and halloysite. They have a two-layer structure consisting of alternating sheets of $SiO_4$ tetra hedra and $AlO_6$ octahedra. Other clays like montmorillonite, bentonites, etc., have also been cited as substitutes for fillers. Clays for the application in FCC formations are required to be purified and have average particle size of about 2 microns or less. The clay which is used in the present investigation is of kaolinite type with more than 80% fraction below 2 microns and sodium content of less than 0.3 wt %.

The zeolite component present in the catalyst composite is in the range of 5–35 wt %, a preferred range being from 15–30 wt %, modified alumina is in the range of 10–40 wt %, a preferred range being 20–30 wt %. Kaolin clay is present in the range of 0–60 wt %, the preferred range being 0–45 wt %. The residual soda level in the finished catalyst is in the range of 0.2–0.7 wt %, preferred level being less than 0.5 wt %. The rare earth oxide content in the catalyst is in the range of 0.5–2 wt %, the preferred range being 0.8–1.2 wt %. The rare earth metal salts employed can either be the salt of a single rare earth metal or mixture of rare earth metals, such as chlorides consisting essentially of Lanthanum, Cerium, Neodymium with minor amounts of Samarium, Gadolinium, and Yttrium.

The calcined microspheres were tested for attrition resistance. This method measures the attrition at a high constant air jet velocity. The fines were removed continuously from the attrition zone by elutriation into a flask-thimble assembly, which was weighed at intervals. These test conditions were similar to those encountered in hydrocarbon conversion operations. The attrited or overhead catalyst so measured is expressed as the weight percent overhead. Percent attrition is calculated as follows:

Percent attrition:

$$\frac{\text{Gms overhead in 5–20 hours period} \times 100}{50 \text{ gms (initial) charge} - \text{gms overhead in 0–5 hrs. period}}$$

High attrition strength is desirable for retaining the microspheres in the reactor.

Our invention is further illustrated by the following specific but non limiting examples.

EXAMPLE 1

This example describes the process for preparation of modified alumina-silica composite component. 17 g formic acid (85% concentration, LR grade, SD Fine Chemicals, India) was diluted with 750 g of DM water. To this diluted acid, 214 g of alumina was added (Pural SB grade with 24 wt % moisture from M/s. Condea, Germany). After thorough dispersion of alumina, the mixture was held for 24 hrs at 40° C. The viscous alumina product with a pH of 2.5–2.75 was then reacted with 156 g of Ammonium Polysilicate (16% $SiO_2$, from Bee Chems, Kanpur, India) and was ready for use.

EXAMPLE 2

This example illustrates the process for preparation of rare earth exchanged USY zeolite. 300 g commercial USY zeolite (with 11 wt % moisture, 1.35 wt % Na, 86% crystallinity, from PQ Corporation, USA) was dispersed in 1 wt % rare earth chloride solution, maintaining solid-liquid ratio of 1:10 at a temperature of 60° C. After exchanging for 20 minutes, zeolite was washed chloride free and dried at 110° C. for 16 hours to obtain rare earth exchanged ammonium Y zeolite. The product contains 4 wt %, Re 0, 0.9 wt % Na.

EXAMPLE 3

This example describes the process for preparation of FCC catalyst using rare earth exchanged USY zeolite prepared as per example 2, non-modified alumina, ammonium polysilicate, and kaolin clay. A slurry with pH of 3.5 and solid content of 28 wt was prepared, having the following composition (wt %): zeolite 25, alumina 30, kaolin clay 40, and silica 5.

214 g of alumina was reacted with 17.25 g of formic acid at room temperature (20° C.). To the alumina, 156 g of ammonium polysilicate and 253 g of kaolin clay (with 15 wt % moisture from Kerala Ceramics, Kundera, India) were added. 166.5 g rare earth exchanged USY zeolite (11 wt % moisture) was made into a fine paste by milling with 170 g DM water. The final slurry was milled thoroughly and spray dried at inlet temperature 330° C., outlet temperature 140° C., and feed rate of 100 g/minute. the spray dried microspheres were calcined at 500° C. for one hour to obtain final FCC catalyst. The calcined catalyst was subjected to hydrothermal deactivation at 788° C. for 3 hours with 100% steam. The catalyst was then evaluated at different W/F ratios (W/F=Weight of the catalyst, g/feed injected, g/min) using a commercial FCCU feedstock, with properties as shown in Table 1. The evaluation results are given in Table 2. Here, 216-conversion is defined as yield weight percent fraction boiling below 216° C.

TABLE 1

PROPERTIES OF COMMERCIAL FCCU FEEDSTOCK USED FOR CATALYST EVALUATION (SOURCE: MATHURA PEFINERY, MATHURA, INDIA)

| WT % | BD ° C. |
|---|---|
| IBP | 310 |
| 5 | 368 |
| 10 | 392 |
| 20 | 410 |
| 30 | 421 |
| 40 | 451 |
| 50 | 462 |
| 60 | 470 |
| 70 | 475 |
| 80 | 477 |
| 90 | 508 |
| 95 | 532 |
| FBP | 548 |
| Density, at 15° C. (g/ml) | 0.927 |
| RCR (wt %) | 0.353 |
| Paraffins (wt %) | 48.94 |
| Naphthenes (wt %) | 16.66 |
| Aromatics (wt %) | 39.40 |
| Nitrogen ppm | |
| Basic | 487 |
| Total | 1207 |

EXAMPLE 4

This example illustrates a process of preparing FCC catalyst as per Example 3 with the exception that modified aluminum silica composite prepared as per example 1 of this invention was used. The product was calcined, steam deactivated, and tested as per the procedure. mentioned in example 3. Evaluation data are given in Table 3. The MAT data can be compared with those of commercial catalysts evaluated under simulated conditions as shown in Table 4. It seems from the data that catalyst made as per the process of our invention in example 4 is highly selective for improved bottom upgradation, it produces less coke and higher gasoline and TCO yields at comparable reaction parameters.

TABLE 2

CATALYST MADE AS PER EXAMPLE 3

| W/F, Min | 0.436 | 0.544 | 0.694 | 0.863 |
|---|---|---|---|---|
| Yield, wt % 216-(conversion) | 33.51 | 40.94 | 45.70 | 57.9 |
| $H_2$ | 0.034 | 0.045 | 0.056 | 0.060 |
| Dry Gas | 0.67 | 0.82 | 0.93 | 1.13 |
| LPG | 6.32 | 7.91 | 8.77 | 11.73 |
| Gasoline | 15.54 | 19.92 | 23.35 | 29.72 |
| Heavy Naphta | 9.21 | 10.28 | 11.14 | 12.33 |
| Light Cycle Oil | 28.68 | 28.56 | 28.93 | 27.34 |
| Total Cycle Oil | 37.89 | 38.84 | 40.07 | 39.67 |
| Bottom (370+) | 37.81 | 30.49 | 25.37 | 14.75 |
| Coke | 1.72 | 1.97 | 2.45 | 2.94 |

TABLE 3

CATALYST MADE AS PER EXAMPLE 4

| W/F, Min | 0.447 | 0.549 | 0.694 | 0.848 |
|---|---|---|---|---|
| Yield, wt % 216-(conversion) | 33.57 | 48.77 | 55.36 | 60.88 |
| $H_2$ | 0.026 | 0.031 | 0.042 | 0.048 |
| Dry Gas | 0.45 | 0.81 | 0.97 | 1.25 |
| LPG | 7.57 | 9.18 | 11.78 | 13.78 |
| Gasoline | 19.48 | 24.83 | 27.69 | 30.41 |
| Heavy Naphta | 10.00 | 11.79 | 12.23 | 12.32 |
| Light Cycle Oil | 28.57 | 28.47 | 27.71 | 26.12 |
| Total Cycle Oil | 38.57 | 40.26 | 39.94 | 38.44 |
| Bottom (370+) | 31.86 | 22.76 | 16.94 | 13.00 |
| Coke | 1.74 | 2.13 | 2.64 | 3.06 |

TABLE 4

CATALYST: COMMERCIAL CATALYST A

| W/F, Min | 0.444 | 0.549 | 0.686 | 0.855 |
|---|---|---|---|---|
| Yield, wt % 216-(conversion) | 34.03 | 38.17 | 50.24 | 56.68 |
| $H_2$ | 0.0209 | 0.0266 | 0.032 | 0.0387 |
| Dry Gas | 0.52 | 0.60 | 0.72 | 0.93 |
| LPG | 6.13 | 7.85 | 10.03 | 11.81 |
| Gasoline | 16.62 | 18.31 | 25.20 | 28.76 |
| Heavy Naphta | 9.03 | 9.19 | 11.56 | 11.85 |
| Light Cycle Oil | 28.38 | 26.48 | 27.78 | 26.67 |
| Total Cycle Oil | 37.41 | 35.67 | 39.84 | 38.52 |
| Bottom (370+) | 37.60 | 35.34 | 21.98 | 16.65 |
| Coke | 1.70 | 2.20 | 2.70 | 3.29 |

EXAMPLE 5

The catalyst made as per the process of this invention was tested for attrition resistance as per the method described above. Comparison of attrition value with that of a commercial catalyst A shows that catalyst of this invention possesses improved attrition resistance.

| Catalyst | Attrition index % |
|---|---|
| As per example 4 | 3.6 |
| A | 13.5 |

It will be apparent from Tables 2 to 4 that better properties of activity and bottom are achieved with the catalyst of the present invention.

What is claimed is:

1. A process for preparation of a hydrocarbon conversion catalyst for use in a Fluid Catalyst Cracking (FCC) unit, comprising the steps of:

preparing a modified alumina-silica composite by reacting alumina with an acid to provide an acidified alumina, aging the acidified alumina for from 0.25 to 60 hours, and adding a silica source to obtain the composite;

preparing a dispersed precursor slurry of the modified alumina silica composite, and a rare earth exchanged USY zeolite (REUSY) containing at least one rare earth oxide present in an amount ranging from 3.8 to 4.0 wt %, and optionally kaolin clay;

spray drying the slurry to obtain spherical particles; and subjecting the spherical particles to calcination.

2. The process according to claim 1, wherein the rare earth exchanged USY zeolite in the catalyst is present in an amount which ranges from 5 to 35 wt %.

3. The process according to claim 1, wherein the kaolin clay is present in an amount which ranges up to 60 wt % based on the total weight of the catalyst.

4. The process according to claim 1, wherein the modified alumina-silica composite is present in an amount ranging from 10–40 wt % based on total weight of the catalyst.

5. The process according to claim 4, wherein the modified alumina-silica composite has a silica to alumina ratio ranging from 0.1:1 to 10:1.

6. The process according to claim 4, wherein the acid is selected from the group consisting of an organic acid, a mineral acid, and mixtures thereof.

7. The process according to claim 4, wherein the aging of the acidified alumina occurs at a temperature ranging from 35–40° C.

8. A process for preparation of a hydrocarbon conversion catalyst for use in a Fluid Catalyst Cracking (FCC) unit, consisting essentially of the steps of:

preparing a modified alumina-silica composite by reacting alumina with an acid to provide an acidified alumina, aging the acidified alumina for from 0.25 to 60 hours, and adding a silica source to obtain the composite;

preparing a dispersed precursor slurry in water consisting essentially of the modified alumina silica composite and a rare earth exchanged USY zeolite (REUSY) containing at least one rare earth oxide present in an amount ranging from 3.8 to 4.0 wt %, and optionally kaolin clay;

spray drying the slurry to obtain spherical particles; and subjecting the spherical particles to calcination to prepare the hydrocarbon conversion catalyst for use in a Fluid Catalyst Cracking (FCC) unit.

9. The process according to claim 8, wherein the rare earth exchanged USY zeolite in the catalyst is present in an amount which ranges from 5 to 35 wt %.

10. The process according to claim 8, wherein the kaolin clay is present in an amount which ranges up to 60 wt % based on the total weight of the catalyst.

11. The process according to claim 8, wherein the modified alumina-silica composite is present in an amount ranging from 10–40 wt % based on total weight of the catalyst.

12. The process according to claim 11, wherein the modified alumina-silica composite has a silica to alumina ratio ranging from 0.1:1 to 10:1.

13. The process according to claim 11, wherein the acid is selected from the group consisting of an organic acid, a mineral acid, and mixtures thereof.

14. The process according to claim 11, wherein the aging of the acidified alumina occurs at a temperature ranging from 35–40° C.

15. A process for preparation of a hydrocarbon conversion catalyst for use in a Fluid Catalyst Cracking (FCC) unit, consisting of the steps of:

preparing a modified alumina-silica composite by reacting alumina with an acid to provide an acidified alumina, aging the acidified alumina for from 0.25 to 60 hours, and adding a silica source to obtain the composite;

preparing a dispersed precursor slurry consisting essentially of the modified alumina silica composite and a rare earth exchanged USY zeolite (REUSY) containing at least one rare earth oxide present in an amount ranging from 3.8 to 4.0 wt %, and optionally kaolin clay;

spray drying the slurry to obtain spherical particles; and subjecting the spherical particles to calcination to prepare the hydrocarbon conversion catalyst for use in a Fluid Catalyst Cracking (FCC) unit.

16. The process according to claim 15, wherein the rare earth exchanged USY zeolite in the catalyst is present in an amount which ranges from 5 to 35 wt %.

17. The process according to claim 15, wherein the kaolin clay is present in an amount which ranges up to 60 wt % based on the total weight of the catalyst.

18. The process according to claim 15, wherein the modified alumina-silica composite is present in an amount ranging from 10–40 wt % based on total weight of the catalyst.

19. The process according to claim 18, wherein the modified alumina-silica composite has a silica to alumina ratio ranging from 0.1:1 to 10:1.

20. The process according to claim 18, wherein the acid is selected from the group consisting of an organic acid, a mineral acid, and mixtures thereof.

21. The process according to claim 18, wherein the aging of the acidified alumina occurs at a temperature ranging from 35–40° C.

* * * * *